L. GAUMONT.
CINEMATOGRAPH FOR NATURAL COLOR PROJECTIONS BY THE THREE-COLOR PROCESS.
APPLICATION FILED FEB. 5, 1912.

1,223,381.  
Patented Apr. 24, 1917.  
2 SHEETS—SHEET 1.

WITNESSES:
Fred White
René Bruine

INVENTOR:
Léon Gaumont,
By Attorneys,
Fraser Turk & Miller

L. GAUMONT.
CINEMATOGRAPH FOR NATURAL COLOR PROJECTIONS BY THE THREE-COLOR PROCESS.
APPLICATION FILED FEB. 5, 1912.
1,223,381.
Patented Apr. 24, 1917.
2 SHEETS—SHEET 2.
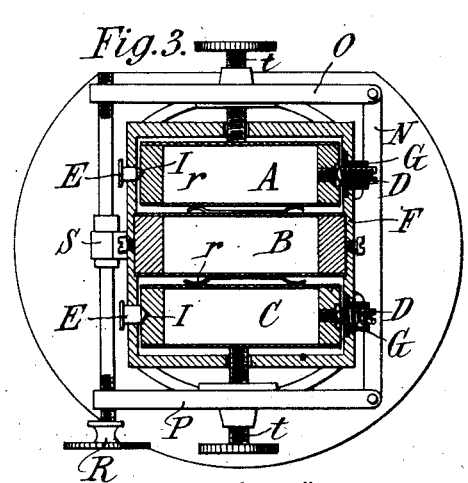
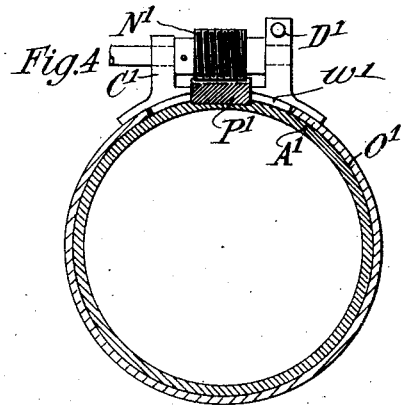
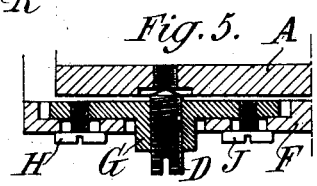
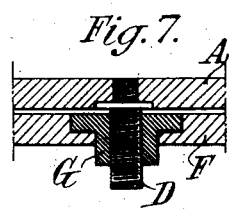
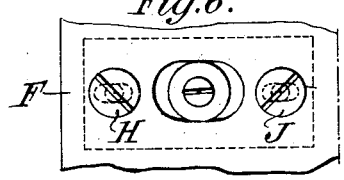
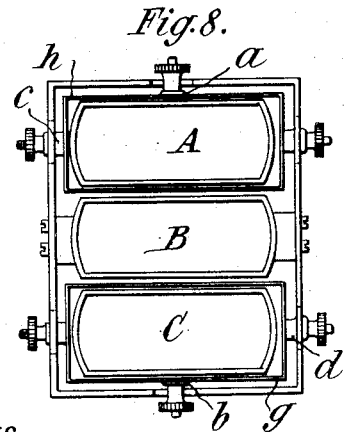
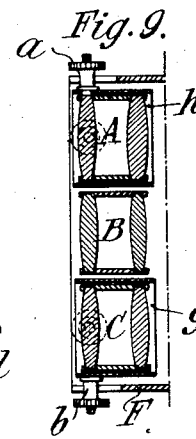
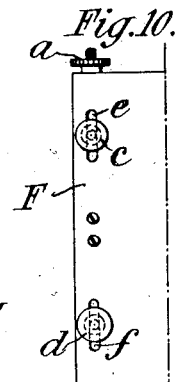
WITNESSES:
Fred White
René Bruine
INVENTOR:
Léon Gaumont,
By Attorneys,

UNITED STATES PATENT OFFICE.

LÉON GAUMONT, OF PARIS, FRANCE, ASSIGNOR, BY MESNE ASSIGNMENTS, TO EASTMAN KODAK COMPANY, OF ROCHESTER, NEW YORK, A CORPORATION OF NEW YORK.

CINEMATOGRAPH FOR NATURAL-COLOR PROJECTIONS BY THE THREE-COLOR PROCESS.

1,223,381.      Specification of Letters Patent.     Patented Apr. 24, 1917.

Application filed February 5, 1912. Serial No. 675,627.

*To all whom it may concern:*

Be it known that I, LÉON GAUMONT, a citizen of the Republic of France, residing in Paris, France, have invented certain new and useful Improvements in Cinematographs for Natural-Color Projections by the Three-Color Process, of which the following is a specification.

The present invention has for its object improvements in cinematographic apparatus for natural color projections by the three color process.

It has already been proposed to take three color cinematographic views by taking three images simultaneously and imparting to the film movements corresponding to the height of the three proofs, *i. e.*, three picture lengths at each feed-movement. For this purpose, cinematographic apparatus is used having three objectives located one above the other between which and the film, or in front of which, are arranged the colored screens.

Such an apparatus, which can only serve for the taking of views, is unsuitable for the projection of pictures, since for projecting it is absolutely necessary to adjust the objectives very accurately in order to obtain an exact superposition of the projected images.

These adjustments which it is necessary to make are the following:

1°. Setting one of the objectives to the right focus and moving the others axially for obtaining on the screen, the same size to each image, for any given distance.

2°. Slightly turning outward the objectives about a vertical axis in order to cause the projections of homologous points of the images of the film onto a screen to register exactly on the same substantially vertical line.

3°. Slightly turning outward the objectives about a horizontal transverse axis for obtaining the desired convergency of their optical axes upon the screen, in other words to obtain the accurate superposition of the projected images.

4°. Turning the whole of the three objectives with their frame about the axis of said frame, in order to bring the three optical axes of the objectives in a plane that agrees with or is parallel to the plane of three homologous points of the film images, *i. e.* to aline the objectives with the film.

Indeed such latter adjustment is necessary when the apparatus used for taking views is not in perfect symmetry, that is when the optical axis of the three objectives are not in the same vertical plane, or when owing to a faulty construction or setting such vertical plane is not parallel to the edges of the film, as then a corresponding point of the subject would not occupy on the images the same position with regard to the film edges.

This adjustment could also be effected by displacing the objectives horizontally, parallelly to their optical axis, and each of them independently and in a proper direction for obtaining the superposition of the projection on the screen.

5°. Varying the spacing apart or the relative incline of the optical axis of the objectives, to make them agree with the spacing of the images on the film, in other words with the varying deviation of the pictures to be projected three by three simultaneously.

This adjustment may be effected either in the first case by a vertical displacement of the optical axes of the end objectives, or in the second case, by pivoting the said objectives about axes located outside their optical center.

The improvements embodying the present invention consist first in mounting the whole optical system comprising the three objectives and the three condensers on a common support capable of sliding vertically so as to allow of the whole to be centered in height with regard to the images, then mounting the three objectives in a common cylindrical casing on this support, in order that they might be turned together about the axis of such casing or frame, and finally mounting two of them each in a frame, these frames being capable of angular displacements about both a vertical and a horizontal perpendicular axis located outside the optical center.

Further a slight axial motion may be imparted to the frame of the two end objectives, for allowing the obtension, as above described, of images of the same size capable of registering exactly.

This whole device provides for the desired adjustment for a first film, but when the film is changed, that is when the distance apart of the axial line of the pictures differs slightly, it is advisable to proceed to a slight additional adjustment which consists in moving the optical axis of the end objectives, apart or toward each other, either by a parallel displacement of their optical axis, or by inclining the same. As the said displacements are equal for both the end objectives, they may be effected simultaneously by a stirrup with two movable arms which can be moved apart or together by means of any device, such as a worm with oppositely directed threads, and which by moving apart or together causes the proper movement apart or together of the two end objectives.

In the annexed drawing:

Fig. 3 is a cross section on the line X X of Fig. 1 and

Fig. 4 is a side view, with the objective supporting means omitted.

Figs. 5, 6 and 7 show on a larger scale the nut for axially adjusting the objectives.

Figs. 8, 9 and 10 are front, sectional and side views respectively of a modification of the mounting arrangement.

In said drawings $I^2$ is a slide, frictionally engaged in its slideway, having the objectives and adjusting mechanism mounted thereon. Means, such as a screw $I^4$, may be provided for adjusting the frame $I^2$.

Figure 1:
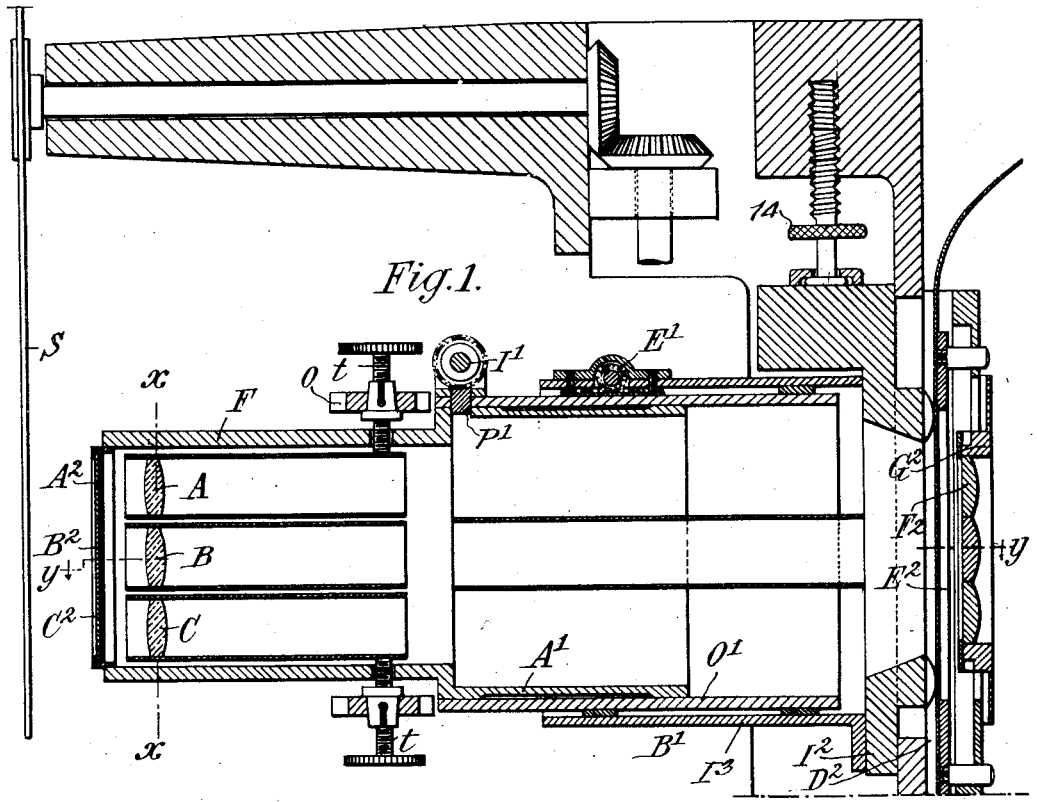
Figure 1 is a vertical section.

On the slide $I^2$ is secured a sleeve or frame $I^3$ in which is a slidable frame $O^1$ carrying at its end a neck $A^1$ carrying on its front a frame F capable of motion on the axis Y Y (Fig. 1). This frame F carries the objectives A, B, C.

Each of the objectives A and C is fixed in the frame F by means of the pins D and E (Fig. 2) about which it may turn.

The objective B is preferably immovably fixed in the frame F.

The nut G of the screw D may move to a small extent in its socket, as shown in Figs. 2, 5, 6, and 7 so as to allow a displacement of the objective on its optical axis to obtain pictures of the same size. Screws H and J are provided for fastening the said nut when set to its determined position (see Fig. 5).

Figure 2:
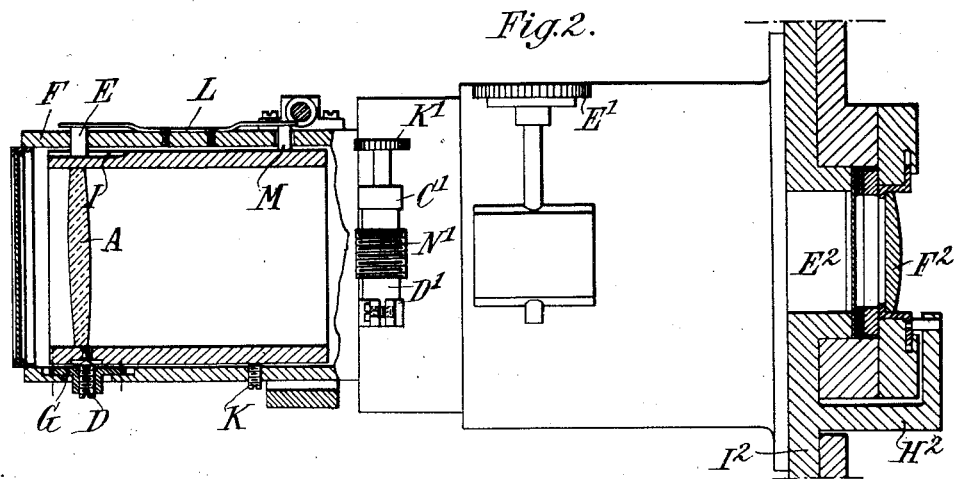
Fig. 2 is a plan and part sectional horizontal view of a part of a cinematographic apparatus comprising the mounting arrangements providing for these five adjustments.

The rear part of the objective is brought against a stop screw K through the action of a pin M and a spring L secured on the frame F. The other end of the spring carries the pin E which engages a V shaped groove, as shown at I (Figs. 2 and 3).

The nature of the engagement of the pins E with the objective frames is however such as to permit limited adjustments of the frames thereon, i. e. the frames may be shifted on the pins E as well as turned on said pins. This arrangement permits of the pivot on the side on which is situated the pin E to be shifted to correspond to the shifting of the nut G carrying the pin D.

Adjustment of the movable objectives A and C on a vertical axis, may be obtained by adjustments of the screw K. By this means the projections may be brought into vertical alinement on the screen.

The ends of the rod R which revolves with its middle portion in a bearing S fixed to the frame F, are screw threaded, one to the right and the other to the left, and engage two bars O P hinged to the ends of a connecting rod N, the ensemble constituting a stirrup with adjustable arms O and P.

The bars O P carry two stop screws $t$ which bear against the upper and lower sides respectively of the objectives A and C said objectives being pressed against the said screws by a spring $r$ arranged between them and the central objective B.

For adjusting the objectives, the whole optic system is so moved as to bring the picture projected through the objective B to the right focus. The objectives A and C are then moved on their axes, by means of the previously loosened nut G, until the corresponding projected pictures appear very clear. The nuts G are then fixed in place.

Now the rear portions of the objectives A and C are acted upon by means of the screws K in order to bring the three pictures to be projected into vertical alinement.

The screws $t$ are manipulated for rotating the objectives A and C in the proper direction about the pins D and E and for causing the pictures to superpose exactly. Movement of the objectives A and C by the screws $t$, without interference by the screws K (and vice versa), is permitted because the screws $t$ and K are unconnected to the objectives and have a flush or sliding bearing thereon.

This adjustment may be effected once for all, and the varying deviations in the spacing of the images may be rectified by means of the rod R which, owing to the inverse screw threads thereon, causes the back ends of the objectives to move together or apart each to an equal extent.

The neck $A^1$ of the frame F which carries the objectives frictionally enters the rack frame proper consisting of the two tubes $O^1$ and $B^1$ sliding into each other and which are controlled by means of pairs of racks and pinions E¹, K¹. The rack and pinion E¹ are used for focusing the ensemble, and the rack and pinion K¹ for vertically alining the ensemble.

The neck A¹ carries a toothed segment P¹ engaging a worm N¹, fixed on a shaft revolving in two bearings C¹ and D¹ integral with the frame O¹, and terminating in an operating stud K¹.

An aperture W¹ made in the frame O¹ allows for an angular movement of the segment P¹ which moves with it the frame A¹ upon which it is fixed. It will be sufficient to turn the stud in K¹ in either direction to cause the frame A¹ to revolve in the desired direction.

At the outer part of the frame F are mounted, within a small removable frame, three colored screens A² B² C², in front of which revolves the shutter disks controlled in the usual manner.

As to the film, it moves along through the channel D² and is so controlled as to move each time a distance corresponding to the height of three pictures. These pictures are passed in front of a window E², of sufficient height behind which are located the condensers F² mounted in a frame G² rigidly connected by means of an angle-piece H², (Fig. 2) or integral with the objective slide I², so as to form an optical system capable of moving with said slide I² and with the objectives carried thereby and allowing of the framing of the picture.

Any suitable lighting device may be used behind the condensers F², and between the lighting device and the condenser F² there is preferably arranged a large condenser F³.

The three objectives A, B and C instead of being circular in section are each limited by two parallel horizontal planes thus allowing for bringing their axes together a distance less than the distance between the centers of the pictures on the film. The means for mounting the objectives may also be carried out in the following manner:—

The central objective Figs. 8, 9 and 10 B is stationary. The end objectives A and C can slightly pivot horizontally the vertical pins $a$ and $b$ in the frames $g$ and $h$ permitting of this. The latter frames $g$ and $h$ are movable in the vertical plane, and further being pivoted about horizontal axes $c$ and $d$ may be slightly inclined. The axles $c$ and $d$ are movable within oval shaped vertical apertures $e$ $f$ (Fig. 10) in the sides of the frame F (Fig. 1), thus allowing for a vertical displacement of the axles $c$ and $d$ and consequently of the objective frames $g$ and $h$.

Tightening studs G are provided for arresting the frames in their proper position and other studs H are provided for assuring the fixity of the objectives A and C within their respective frame.

Having thus described and ascertained the nature of my present invention and in what manner it is to be performed what I claim is:

1. A cinematographic apparatus for color projections by means of the three color method, comprising three objectives and a common support for the objectives, said support being rotatable about the axis of said support for bringing said objectives in vertical alinement.

2. A cinematographic apparatus for color projections by means of the three color method, comprising three objectives mounted upon a common objective support, two of said objectives being pivotally mounted on vertical and horizontal axes in said objectives' support, whereby the projections may be superposed.

3. A cinematographic apparatus for color projections by means of the three color method, comprising three objectives, two of which are pivoted and displaceable around the pivots with relation to the third, a stirrup having two members capable of being moved apart or together and having stops thereon limiting the pivotal movements of the displaceable objectives.

4. A cinematographic apparatus for color projections by means of the three color method, comprising a frame, three objectives, a support therefor capable of sliding vertically on the frame, an inner sleeve on the said support, means for rotating said sleeve in said support, a mounting on said sleeve for said objectives, two of said objectives being mounted to be movable around vertical and horizontal axes.

5. In a cinematographic apparatus for color projections by means of the three color method, comprising three objectives, two of said objectives being mounted upon pairs of horizontal pivots, one of the pivots of each pair being longitudinally movable, and each pivoted objective being longitudinally movable on the second pivot of each pair so as to allow for the axial displacement of the pivoted objectives, screw stops adapted to limit the pivotal movement of said pivoted objectives around their horizontal axes, and springs tending to move said pivoted objectives against said stops.

6. In a cinematographic apparatus for color projections by means of the three color method, comprising three objectives, two of said objectives being mounted upon pairs of horizontal pivots, one of the pivots of each pair being movable longitudinally of the optical axis of the objective, and each pivoted objective being movable longitudinally of the optical axis of the objective on the second pivot of each pair so as to allow for the axial displacement of the pivoted objectives, screw stops adapted to limit the pivotal movement of said pivoted objectives around their horizontal axes, and springs tending to move said pivoted objectives against said stops, lateral stop screws adapted to move each of said pivoted objectives around a vertical axis, and springs tending to press said objectives against said lateral stops.

7. A cinematographic apparatus for color projections by means of the three color method, comprising three objectives, two of which are pivoted and displaceable around the pivots with relation to the third, a stirrup having two members capable of being moved apart or together and having stops thereon limiting the pivotal movements of the displaceable objectives, and an oppositely threaded screw adapted to move said members of said stirrups together and apart.

8. In a cinematographic apparatus for color projections, the combination of a plurality of objectives mounted in close proximity to one another, means for collectively bringing said objectives into vertical alinement, said objectives being individually mounted to be movable on vertical axes and means for adjusting said objectives individually on their vertical axes for bringing the vertical axes of the projections into alinement.

9. In a cinematographic apparatus for color projections, the combination of a plurality of objectives mounted in close proximity to one another, means for bringing said objectives into vertical alinement, means for collectively focusing said objectives, and means for individually focusing said objectives.

10. In a cinematographic apparatus for color projections, the combination of a plurality of objectives mounted in close proximity to one another upon a common objective support, one or more of said objectives being pivoted horizontally in said support, means for moving said objectives to bring the projections into vertical alinement, and means for adjusting said pivoted objective to bring the horizontal axes of the projections into alinement.

11. In a cinematographic apparatus for color projections, the combination of a plurality of objectives of substantially equal focal length mounted in close proximity to one another upon a common objective support, and one of said objectives being pivoted upon a vertical axis, one of said objectives being pivoted upon a horizontal axis in said support, means for adjusting said objective individually on its vertical axis for bringing the vertical axes of the projections into alinement, and means for adjusting said pivoted objective to bring the horizontal axes of the projections into alinement.

12. In a cinematographic apparatus for color projections, the combination of a plurality of objectives mounted in close proximity to one another, means for bringing said objectives into vertical alinement, means for adjusting said objectives on horizontal axes to bring the horizontal axes of the projections into alinement, and means for collectively focusing said objectives.

13. In a cinematographic apparatus for color projections, the combination of a plurality of objectives mounted in close proximity to one another, means for bringing said objectives into vertical alinement, means for adjusting said objectives on horizontal axes to bring the horizontal axes of the projections into alinement, means for collectively focusing said objectives, and means for individually focusing said objectives.

14. In a cinematographic apparatus for color projections, the combination of a plurality of objectives mounted in close proximity to one another, means for adjusting said objectives individually on vertical axes for bringing the vertical axes of the projections into alinement, means for adjusting said objectives on horizontal axes to bring the horizontal axes of the projections into alinement, means for collectively focusing said objectives, and means for individually focusing said objectives.

15. In a cinematographic apparatus for color projections, the combination of a plurality of objectives mounted in close proximity to one another upon a common support, said support being adjustable for collectively bringing said objectives into opposite relation to the images to be projected.

16. In a cinematographic apparatus for color projections, the combination of a plurality of objectives mounted in close proximity to one another, means for collectively adjusting said objectives to bring them into opposite relation to the images to be projected, and means for individually moving said objectives to bring them into opposite relation to the images to be projected.

17. In a cinematographic apparatus for color projections, the combination of a plurality of objectives mounted in close proximity to one another, a common support for said objectives, means for rotating said support for bringing said objectives into vertical alinement, means for individually moving the objectives around vertical axes to bring the vertical axes of the projections into alinement, means for individually moving said objectives around horizontal axes to bring the horizontal axes of the projections into alinement, and means for spacing said objectives with relation to one another for bringing them individually opposite the respective images to be projected.

18. In a cinematographic apparatus for color projections, the combination of a plurality of objectives mounted in close proximity to one another, a common support for said objectives, means for rotating said support for bringing said objectives into vertical alinement, means for individually moving the objectives around vertical axes to bring the vertical axes of the projections into alinement, means for individually moving said objectives around horizontal axes to bring the horizontal axes of the projections into alinement, means for spacing said objectives with relation to one another for bringing them individually opposite the respective images to be projected, and means for focusing said objectives.

19. In a cinematographic apparatus for color projections, the combination of a plurality of objectives mounted in close proximity to one another, a common support for said objectives, means for rotating said support for bringing said objectives into vertical alinement, means for individually moving the objectives around vertical axes to bring the vertical axes of the projections into alinement, means for individually moving said objectives around horizontal axes to bring the horizontal axes of the projections into alinement, means for spacing said objectives with relation to one another for bringing them individually opposite the respective images to be projected, and means for individually focusing said objectives.

20. In a cinematographic apparatus for color projections, the combination of a plurality of objectives mounted in close proximity to one another, a common support for said objectives, means for rotating said support for bringing said objectives into vertical alinement, means for individually moving the objectives around vertical axes to bring the vertical axes of the projections into alinement, means for individually moving said objectives around horizontal axes to bring the horizontal axes of the projections into alinement, and means for spacing said objectives with relation to one another for bringing them individually opposite the respective images to be projected, and means for individually and collectively focusing said objectives.

In witness whereof, I have hereunto signed my name in the presence of two subscribing witnesses.

LÉON GAUMONT.

Witnesses:
H. C. COXE,
GABRIEL BELLIARD.